Sept. 18, 1934.    L. BAILEY    1,974,324
PIPE PUSHING MACHINE
Filed Oct. 26, 1933    2 Sheets-Sheet 1
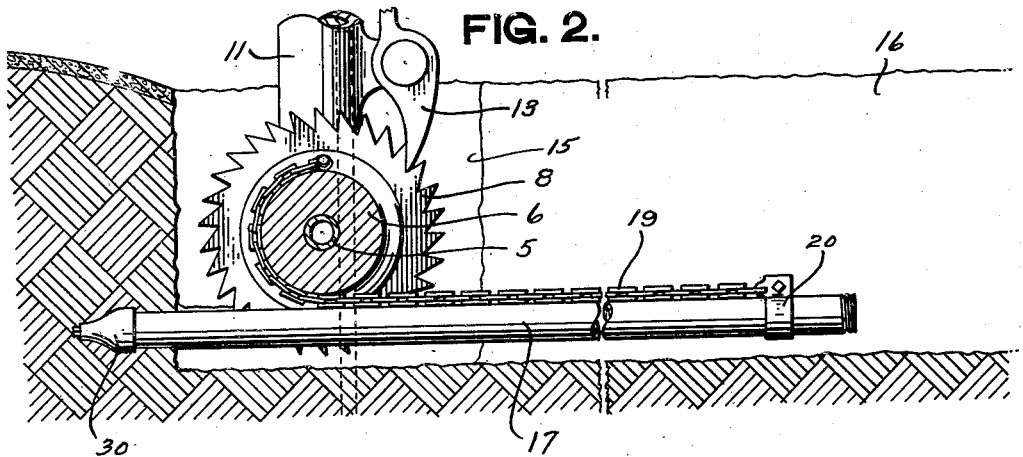
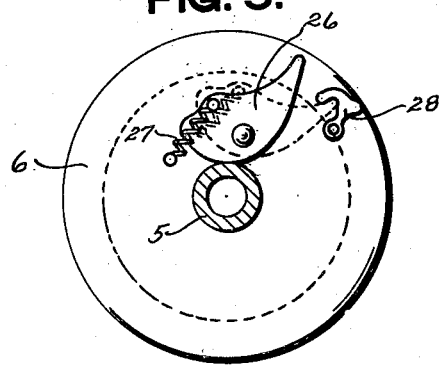
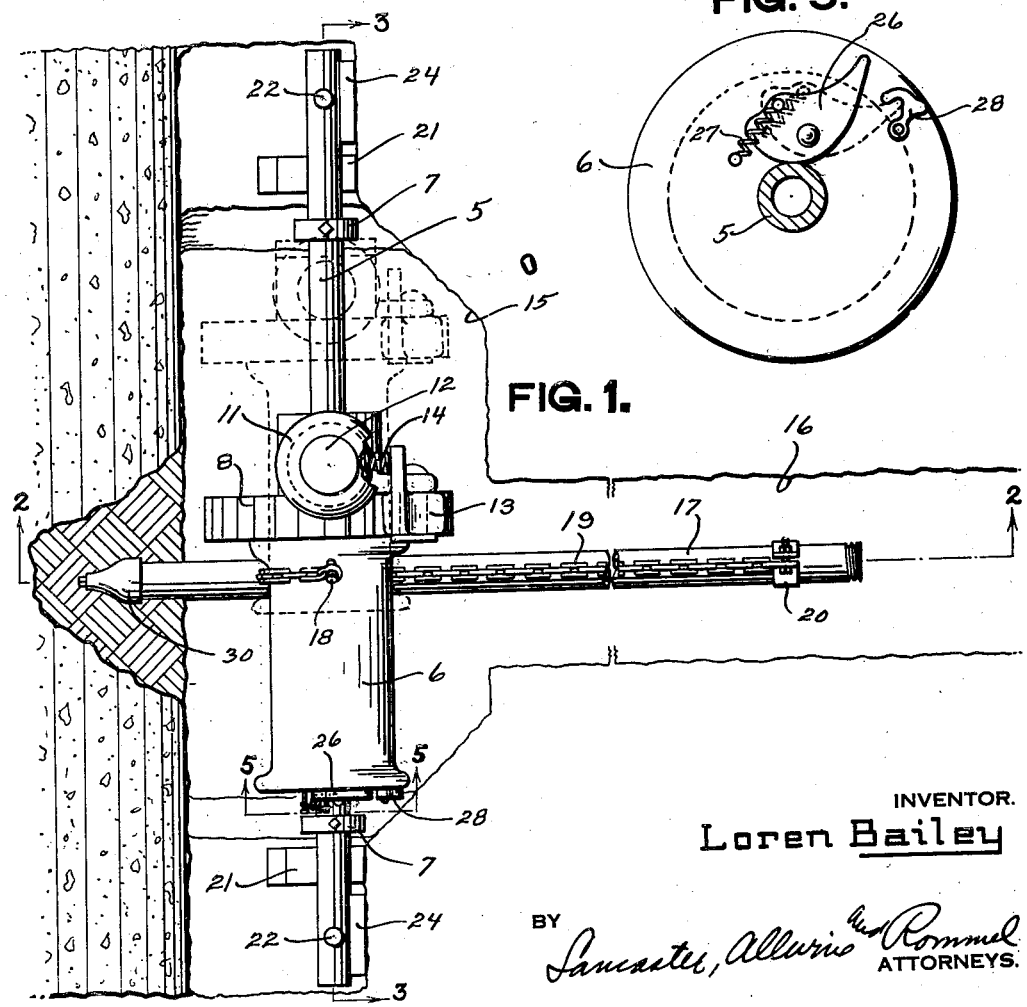
INVENTOR.
Loren Bailey
BY
ATTORNEYS.

Sept. 18, 1934.                L. BAILEY                1,974,324
                           PIPE PUSHING MACHINE
                    Filed Oct. 26, 1933      2 Sheets-Sheet 2
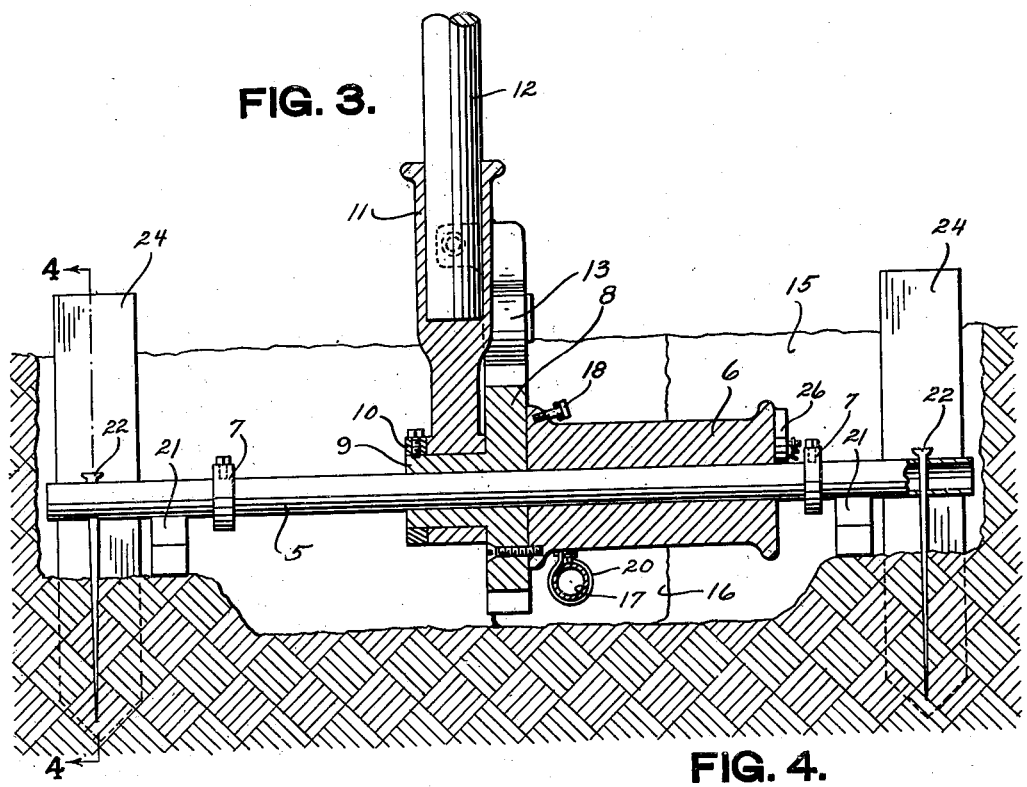
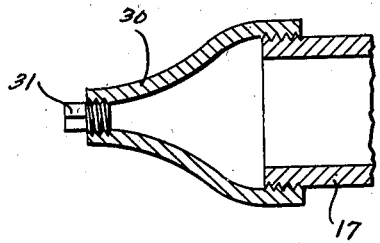
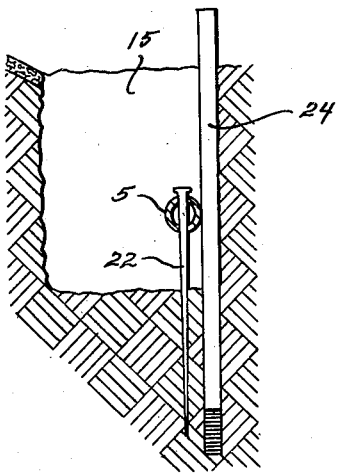
INVENTOR.
Loren Bailey Patented Sept. 18, 1934

1,974,324

UNITED STATES PATENT OFFICE 1,974,324

PIPE PUSHING MACHINE

Loren Bailey, Metzger, Oreg.

Application October 26, 1933, Serial No. 695,367

9 Claims. (Cl. 254—29)

The present invention relates to apparatus for laying underground pipes and the primary object of the invention is to provide a pipe pushing machine for placing service pipes and the like under roadways, streets, lawns, etc., without requiring the usual digging of trenches or ditches into which the pipe is placed.

A further object of the invention is to provide a pipe pushing or placing machine whereby in a straight pull is exerted on the pipe for pushing the pipe thru the ground so as to prevent the pipe from springing or bending out of shape when a heavy pressure is applied as when pushing the pipe thru relatively hard ground.

A further object is to provide a machine of this character whereby great power may be applied to the pipe, and which machine is relatively small so as to permit placing of the machine for use within a comparatively small ditch.

A further object is to provide a pipe pushing machine which is light in weight permitting ready and easy handling of the machine, and one which may be used for pushing either long or short lengths of pipes.

A still further object resides in the arrangement whereby water may be forced thru the pipe to facilitate pushing the pipe thru the ground, and also permitting the pipe to be oscillated.

Other objects and advantages of the invention will be apparent from the following detailed description, taken in connection with the accompanying drawings forming a part of this specification and in which drawings:—

Figure 1 is a top plan view of the machine in position for use for pushing a pipe under a roadway.

Figure 2 is a vertical section on the line 2—2 of Figure 1.

Figure 3 is a section substantially on the line 3—3 of Figure 1.

Figure 4 is a vertical section on the line 4—4 of Figure 3.

Figure 5 is an enlarged fragmentary section on the line 5—5 of Figure 1.

Figure 6 is an enlarged section thru a cap for use upon the end of the pipe to be pushed thru the ground.

In the drawings and wherein like reference characters designate corresponding parts thruout the several views, the machine comprises a supporting tube or shaft 5 upon which is rotatably mounted a drum 6 which is adapted for limited longitudinal movement along the supporting shaft. Adjustably secured to the shaft 5 at each side of the drum 6 is a collar 7 and these collars are spaced adjacent the ends of the shaft to permit limited movement of the drum along the shaft during the pipe placing operation. These collars also serve to prevent the drum from slipping off the ends of the shaft during handling of the pipe pushing machine.

Secured axially of one end of the drum 6 is a ratchet wheel 8 having an axial sleeve portion 9 thru which the shaft 5 extends. Rotatable upon the sleeve portion 9 and held against displacement by a collar 10, is a suitable handle socket 11 for receiving one end of an operating handle or lever 12. Pivoted upon the socket member 11 is a suitable dog 13 adapted to engage the teeth of the ratchet wheel 8 and normally spring urged into engagement with the ratchet teeth by a suitable spring 14 as shown in Figure 1. Thus, as the socket member 11 is rocked back and forth by the lever 12 the drum 6 will be rotated about the shaft 5.

The machine is intended to be placed in a cross ditch or trench 15 provided at one end of a main or pipe trench 16 in which the pipe 17 is placed. The length of pipe 17 which is to be pushed thru the ground is placed to extend at a right angle to the supporting shaft 5 and below the drum 6. Secured at one end as at 18 to an end portion of the drum 6 is a flexible pull member in the form of a chain 19 and this chain is provided at its opposite end with a clutch or gripping clamp 20 for attachment to the pipe 17. The clutch 20 may be in the form of a slip collar which is either clamped about the pipe or has a gripping action upon the pipe thru a slight rocking movement when a tension is placed on the chain 19. As will be observed in Figures 2 and 3, the pipe to be placed extends closely beneath the drum 6 and the chain winds upon the drum from the under side of the drum.

The supporting tube or shaft 5 aside from providing a support for the winding means, also serves as an anchor. The opposite end portions of the shaft 5 may be blocked up as at 21 for disposing the drum 6 at the desired elevation in the trench 15. The ends of the supporting shaft are apertured to receive anchoring pins or spikes 22 which may be driven into the ground and serve to prevent rotation of the shaft and also hold the shaft against axial movement.

Driven into the ground at each end of the shaft 5 so as to bear against the wall of the cross trench 15, are broad flat abutments or thrust plates 24 against which the ends of the shaft abut to prevent lateral movement of the shaft when the drum is rotated for forcing the pipe 17 thru the ground.

Mounted upon the opposite end of the drum 6 from which the ratchet wheel 8 is mounted, is an eccentric 26 having a cam surface adapted to engage the cylindrical surface of the shaft 5 to prevent counter-rotation of the drum during return movement of the lever 12. A spring 27 acts to normally urge the eccentric into engagement with the shaft 5, and a suitable catch 28 serves to hold the eccentric disengaged from the shaft 5 to permit unwinding of the chain 7 from the drum.

By observing Figures 2 and 5 it will be noted that when the drum 6 is rotated in a clockwise direction for winding the chain upon the drum, the cam or eccentric 26 rides freely about the shaft 5. When the handle socket 11 is rocked in a counter-clockwise direction by the lever 12, the cam surface of the eccentric 26 will bind upon the shaft 5 and prevent counter rotation of the drum by the chain 19.

Referring particularly to Figure 6, a hollow conical cap 30 is placed upon the end of the pipe 17 and the smaller end of this cap is internally screw threaded for receiving a plug 31. If the ground in which the pipe is being placed is relatively hard, the plug 31 is removed and a hose coupled to the outer end of the pipe whereby water may be forced thru the pipe to facilitate forcing of the pipe. With the plug 31 removed, the cap 30 acts as a nozzle for boring a hole and softening the ground at the leading end of the pipe. Since there is no rigid connection between the pipe being pushed and the machine, the pipe may be readily oscillated by placing a wrench or the like upon the pipe so as to further aid in forcing the pipe thru hard ground.

In using the machine for placing a pipe, say under a roadway or the like, a cross ditch or trench as at 15 is first dug along one side of the roadway for a depth slightly greater than the depth at which the pipe is to be placed and of a length sufficient to receive the supporting tube or shaft 5. A main or pipe trench as at 16 is then dug to extend at a right angle to the roadway and opens into the cross ditch 15 at a point substantially midway the ends of the ditch 15. The pipe trench 16 may be of such length as to accommodate the length of pipe being used. If there are no obstructions at the sides of the roadway the trench 16 may be relatively long so as to permit use of long lengths of pipe 17.

After the trenches are suitably dug, the machine is lowered into the cross ditch 15 and the supporting tube or shaft 5 blocked up by the means 21 to support the shaft horizontally with the periphery of the drum 6 at an elevation to permit passing of the pipe 17 beneath the drum. The abutment or thrust plates 24 may then be driven into the ground so as to engage the wall of the cross ditch 15 and the shaft 5 shifted into engagement with the abutment plates. The anchoring pins or spikes 22 may then be driven into the ground thru the openings in the ends of the supporting tube whereby the tube is held against rotation and also against longitudinal movement.

With the machine thus in position for use, a section of pipe 17, provided with the cap 30, is placed to extend transversely beneath the drum 6 and may be started in any suitable manner as by digging a small positioning hole in the wall of the cross ditch 15. The chain is then unwound from the drum 6 and the clamp 20 applied to the pipe. Any suitable length of the chain 19 may be unwound from the drum and this will depend upon the nature of the ground and the strength of the pipe being placed. If the ground is relatively hard and the pipe thin, only enough chain is unwound to prevent buckling of the pipe when pressure is applied.

After the chain has been connected to the pipe, the winding means is shifted on the supporting shaft 5 so that the chain 19 has a straight pull directly above the pipe as shown in Figures 1 and 2. The lever 12 is then rocked back and forth whereby thru the ratchet wheel 8 and dog 13 the chain 19 will be wound upon the drum 6 thus forcing the pipe thru the ground. As the chain winds upon the drum 6 the drum is shifted along the shaft 5 as the chain winds upon the drum. Thus the floating drum retains the chain 19 directly above and in straight alignment with the pipe 17. When the chain 19 is fully wound upon the drum 6, the drum together with the ratchet wheel and operating lever will be shifted along the supporting shaft to the dotted line position shown in Figure 1. After the chain is fully wound upon the drum, the clutch or gripping clamp 20 is slid outwardly along the pipe unwinding the chain. When unwinding the chain, the eccentric 26 may be caught behind the catch 28 so as to allow for ready unwinding of the chain. As the pipe sections are forced thru the ground, additional sections may be connected to the rear end of the pipe in the trench 16 until the required length of pipe has been forced thru the ground.

Thus, by having the winding means floating on the shaft 5, allowing the drum 6 to shift longitudinally along the shaft, the chain 19 will remain in a position directly above the pipe being placed so as to exert a straight pull on the pipe. By providing the cam or eccentric 26, no back lash will occur and there will be no lost motion during operation of the machine.

Changes in details may be made to the form of invention herein shown and described, without departing from the spirit of the invention or the scope of the following claims.

I claim:

1. In a pipe pushing machine, a plain cylindrical supporting shaft, means for securing the shaft in a fixed position for use, a drum rotatable and longitudinally slidable on the shaft, a ratchet wheel fixed to one end of the drum, an operating lever pivoted on the ratchet wheel and movable with the drum longitudinally on the shaft, a pawl carried by the lever and engaging the teeth of the ratchet wheel for rotating the drum, a chain secured at one end to the drum and extending therefrom at the lower side of the drum, and a pipe gripping member on the opposite end of the chain.

2. In a pipe pushing machine, a plain cylindrical supporting shaft, means for securing the shaft at each end against movement, a drum rotatable and freely longitudinally slidable upon the intermediate portion of the shaft, stop means adjustable along the shaft at each end of the drum for limiting longitudinal movement of the drum, means for rotating the drum, said means being carried by and movable along the shaft with the drum, a chain secured at one end to an end of the drum for winding thereon, and pipe gripping means at the opposite end of the chain.

3. In a pipe pushing machine, a cylindrical supporting shaft, anchoring means for each end of the shaft securing the shaft against rotation and providing abutments therefor, a drum rotatable and longitudinally movable on the intermediate portion of the shaft, ratchet means carried by and movable with the drum for rotating the drum in one direction, means acting between the drum and shaft for preventing counter-rotation of the drum, a chain adapted to be wound upon the drum from the under side thereof by the ratchet means, and a pipe gripping means carried by the chain.

4. In a pipe pushing machine, a cylindrical supporting shaft, means for anchoring the shaft against movement, a drum rotatable on the shaft, ratchet means at one end of the drum for rotating the drum in one direction, means acting between the drum and shaft for preventing back lash on the drum, and a chain connected to said drum for connection with the pipe being placed.

5. In a pipe pushing machine, a cylindrical supporting shaft, means for securing the shaft in a horizontal position for use, a drum rotatable and freely longitudinally movable on the shaft, a ratchet wheel secured to one end of the drum and having a sleeve encircling the shaft, an operating lever pivoted on said sleeve, a pawl carried by the operating lever for acting upon the ratchet wheel to rotate the drum in one direction, and a chain wound upon the drum and extending from the under side thereof for connection at one end to the pipe being placed, said pipe to be disposed beneath and at a right angle to the axis of the drum.

6. In a pipe pushing machine, a cylindrical supporting shaft, means for securing the shaft against rotation, a drum rotatable and longitudinally slidable on the shaft, lever operated ratchet means at one end of the drum for imparting rotation to the drum in one direction, a chain secured at one end to the drum to be wound thereon from the under side of the drum, a pipe gripping member secured to the chain, and an eccentric carried by the opposite end of the drum from said ratchet means for engaging the shaft to prevent counter-rotation of the drum to that in which the drum is rotated by the ratchet means.

7. In a pipe placing machine, a drum having a plain axial opening for receiving a cylindrical supporting shaft, ratchet means mounted upon one end of the drum for rotating the drum in one direction, a lever for operating the ratchet means, releasable means on the drum for preventing counter-rotation of the drum on its support, a chain secured at one end to the drum and to be wound thereon from the under side of the drum, and a pipe gripping device carried by the opposite end of the chain.

8. In pipe pushing apparatus for positioning in a cross trench, a supporting shaft having apertured ends, anchoring spikes adapted to be driven thru the apertures in the opposite ends of the shaft and into the ground for holding the shaft against movement, an abutment plate adapted to be driven into the ground adjacent each end of the shaft, winding means including a drum rotatable and longitudinally slidable upon the intermediate portion of the shaft, stop collars on the shaft for limiting longitudinal movement of the winding means, and a pipe engaging chain connected to the drum for winding thereon.

9. In a pipe pushing machine, a cylindrical supporting shaft, means for supporting the shaft in a fixed position for use, a stop collar secured to each end portion of the shaft, a drum rotatable and longitudinally movable on the shaft between the collars, a ratchet wheel secured to one end of the drum and having a sleeve portion encircling the shaft, a handle socket rotatable on said sleeve portion, a spring urged pawl pivoted on the handle socket for engaging the teeth of the ratchet wheel to rotate the drum in one direction, releasable means carried by the drum and engaging the shaft for normally preventing counter-rotation of the drum, an operating lever projecting from the handle socket, a chain secured at one end to the drum for winding thereon, and a pipe gripping member carried by the free end of the chain.

LOREN BAILEY.